S. J. Seely.
Passenger Car.

No. 1,055. Reissued Oct. 2, 1860.

Witnesses.
E. B. Richards
Chas. L. Daves.

Inventor.
Saml. J. Seely

UNITED STATES PATENT OFFICE.

SAMUEL J. SEELY, OF NEW YORK, N. Y., ASSIGNOR TO CHARLES W. DURANT, OF SAME PLACE.

IMPROVEMENT IN RAILROAD-CARS.

Specification forming part of Letters Patent No. 28,041, dated April 24, 1860; Reissue No. 1,055, dated October 2, 1860.

*To all whom it may concern:*

Be it known that I, SAMUEL J. SEELY, late of Buffalo, New York, but now of the city of New York, in said State, have invented certain new and useful Improvements in the Construction of Railroad-Cars and other Vehicles; and I do hereby declare that the following is a full and exact description of the same, reference being had to the accompanying drawings, and to the letters of reference marked thereon, in which—

Figure 3:
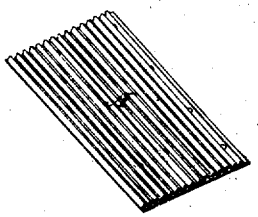
Figure 5:
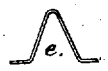
Figure 4:
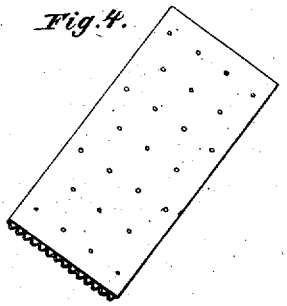
Figure 1:
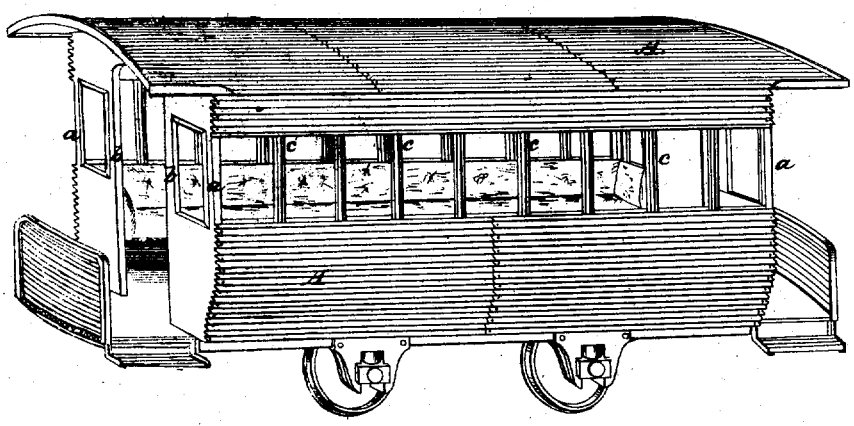
Figure 2:
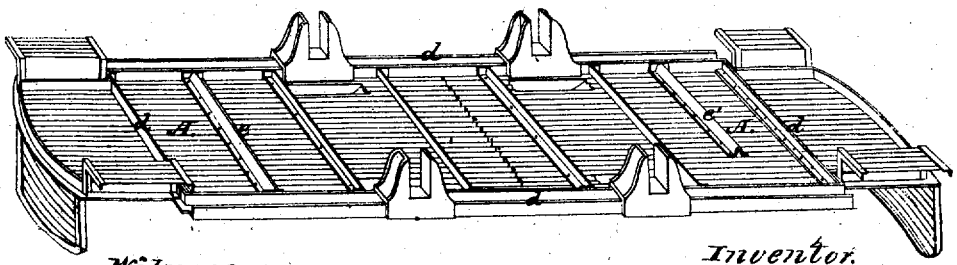

Figure 1 is a perspective view of a railroad-car embodying my improvements. Fig. 2 is a similar view of the under side of the bottom of the car. Fig. 3 is a similar view of one of the plates detached, showing its corrugations. Fig. 4 is a similar view of the reversed side of Fig. 3, showing a flat plate secured to and upon the corrugations to form a flat surface when desired. Fig. 5 is an end view of the trough-iron used to stay the bottom of the car.

My invention consists in constructing the bodies of railroad-cars and other vehicles of corrugated metal plates, secured by and upon suitable axle-irons, and properly braced and strengthened by trough-irons, the design of my invention being to secure a greater degree of strength to bear weight or resist pressure than has ever before been attained with the same weight of material.

The body of the car or vehicle is made entirely of plates of iron, which are bent or pressed up, by proper dies or other suitable means, into the corrugations shown in the drawings at A A. By giving the metallic plates this form a vastly increased strength is obtained to support weight or burden, and also to withstand pressure or resistance from without—as in the case of a collision or other accident—over metal applied or used in flat plates. These corrugations may be larger or smaller, according to the size of the car or vehicle, the principal thing to be regarded in their formation being that their bends should not be so acute as to break or crack the metal to impair its natural strength. The top, bottom, and sides of the body of the car, as shown in Figs. 1 and 2, are formed of corrugated metal plates, which are riveted or otherwise properly secured together. The plates may be lapped over each other and then be riveted or otherwise fastened together where their ends lap, or they may be made to abut against each other and the joints be covered by corrugated strips placed on one or both sides of the plates, to be riveted to the plates. Where the plates join together at their sides they can be most securely fastened by letting them lap over each other the distance of one or two of the corrugations and then riveting the edges together. Strong pieces of angle-iron *a a* are used to form the base and corners of the car, and to these pieces the corrugated plates are riveted. The door-casings *b b* are also made of metal, and may be made of a continuous piece shaped and bent to form, to which the corrugated plates are secured. Angle-irons *c c* extend up the sides of the car to form the casings of the windows, and, if desired to add increased strength, some or all of them may be extended under and across the bottom of the car. To these irons the corrugated plates are also riveted and secured wherever it may be deemed necessary. Other pieces of angle-iron *d d* extend across the bottom of the car to form the frame-work and to dispense with the use of heavy timbers for such purpose. These are secured in place by rivets or other fastenings, as before described. Instead and in place of the angle-irons last named, the trough-irons *e e*, Fig. 2, (shown detached in Fig. 5,) may be used to great advantage, their form giving increased strength to the floor of the car without adding materially to its weight.

As a general thing the body of the car or vehicle will be formed of two corrugated plates secured together, with the corrugations on one plate running transversely to those on the other to give to the plates equal strength in both a longitudinal and vertical direction. Such plates will be found particularly useful to form the floors of cars and vehicles designed for freight and burden, as they then act to strengthen each other in the direction of their weakest point—that of the line of their corrugations.

Where it is desirable to have the interior of the car or vehicle smooth, to cover the corrugations, thin plates of metal can be placed upon and be riveted to the corrugated plates, as shown in Figs. 3 and 4, and when desired these flat plates may be struck up with figures or designs to render them ornamental. The spaces between the plates last described or between the double corrugated plates named may be used to form ventilators to the cars in warm weather or to convey heated air to them in cold weather.

In constructing cars and other vehicles in the manner herein described they are lighter and stronger than if made of wood in the usual manner, or if made of a combination of metal plates and wood, as has been before proposed.

I am aware that corrugated metal plates have been used in the construction of the bodies of vehicles, and I do not therefore broadly claim their use in the construction of railroad-cars and other vehicles; but What I do claim as my invention, and desire to secure by Letters Patent, is—

1. The application of corrugated metal plates combined with and secured to and upon the angle-irons *a b c d* for the construction of the bodies of railroad cars and other vehicles, as herein set forth.

2. The application of the said corrugated metal plates and angle irons, combined with the trough-irons *e*, as set forth, for the purpose described.

SAML. J. SEELY.

Witnesses:
FRANCIS S. LOW,
GEO. H. STANLEY.